United States Patent

[11] 3,615,673

[72] Inventors Stewart L. Black
Lee's Summit;
John C. Littlefield, Kansas City, both of Mo.
[21] Appl. No. 792,196
[22] Filed Dec. 20, 1968
[45] Patented Oct. 26, 1971
[73] Assignee The Vendo Company
Kansas City, Mo.

[54] METHOD AND APPARATUS FOR PREPARING CARBONATED BEVERAGES WITHIN A CUP
16 Claims, 14 Drawing Figs.
[52] U.S. Cl............................................... 99/79,
62/320, 99/28, 99/136, 141/69, 141/91, 222/148,
261/DIG. 7
[51] Int. Cl........................................ A23l 1/00,
F25c 7/00
[50] Field of Search............................. 99/28, 79,
189, 136, 275; 261/DIG. 7, 64 R, 64 B, 87, 93, 121
R; 62/320; 141/69, 91; 222/1, 3, 148

[56] References Cited
UNITED STATES PATENTS
1,546,510  7/1925  Possner................... 261/64
2,409,067  10/1946 Reed......................  99/79
2,826,401  3/1958  Peters.....................  261/87
3,505,075  4/1970  Black......................  99/28

Primary Examiner—Morris O. Wolk
Assistant Examiner—Stephen B. Davis
Attorney—Schmidt, Johnson, Hovey & Williams ABSTRACT: A disposable cup containing beverage ingredients including ice is placed within a rigid receptacle. A closure is moved into the open top of the cup sealing its interior from the ambient atmosphere. A cutter carried by the closure is rotated within the cup to agitate the ingredients while carbon dioxide is forced into the cup through the closure at a pressure which would normally deform the cup walls. Following the agitation, the closure lifts out of the cup under the influence of the pressurized carbon dioxide. Means are disclosed to cleanse the closure and cutter.

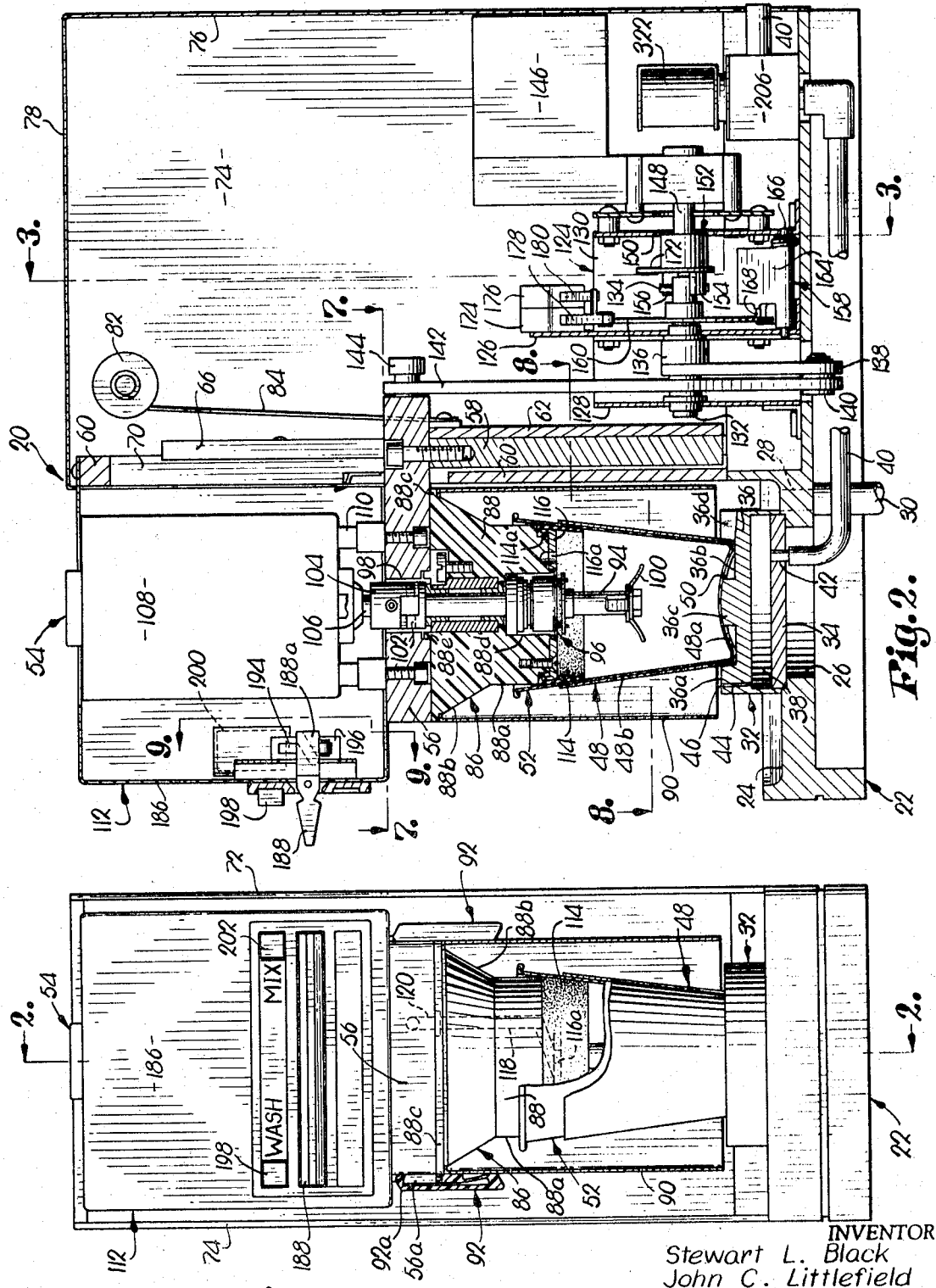

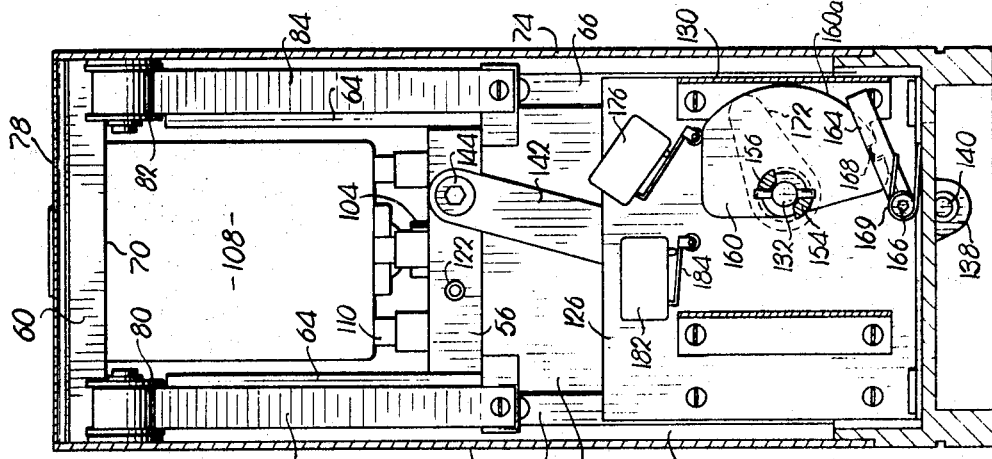
*Fig. 3.*
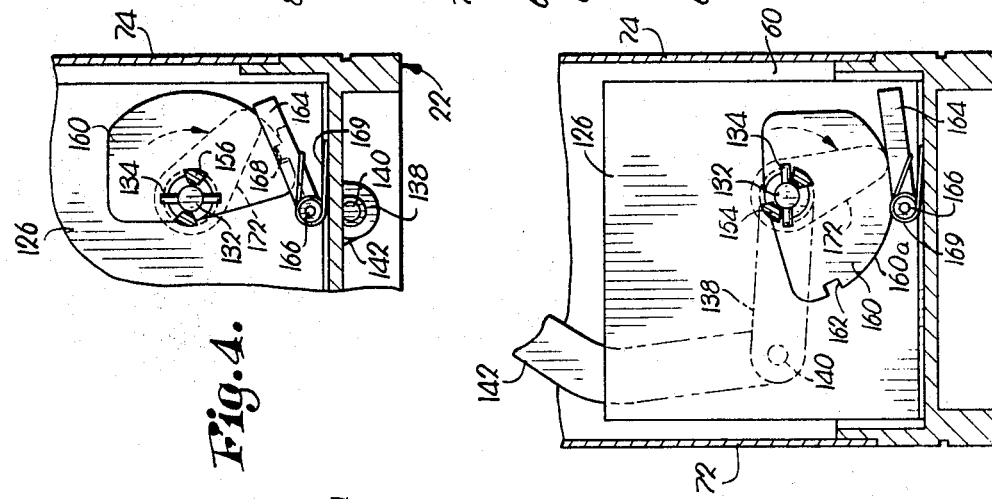
*Fig. 4.*  *Fig. 5.*
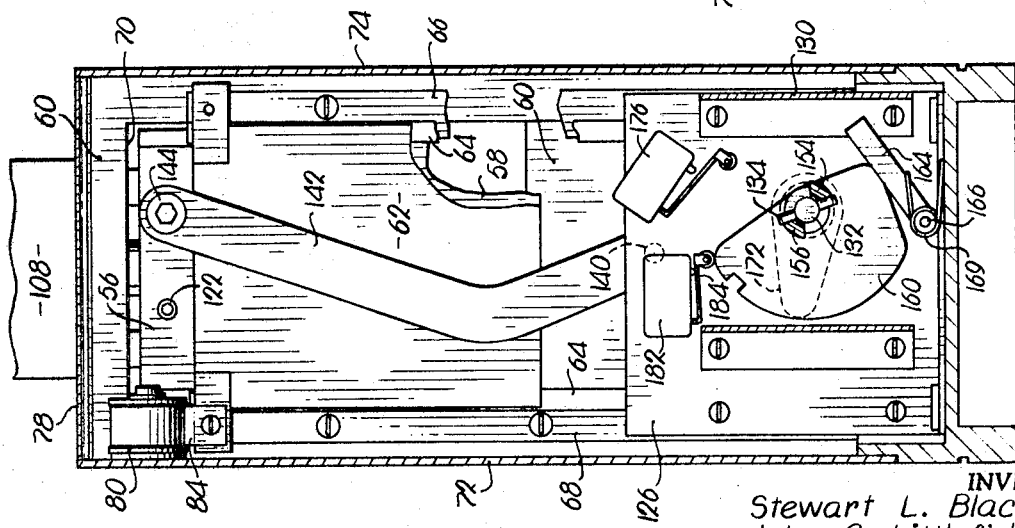
*Fig. 6.*
INVENTORS.
Stewart L. Black
John C. Littlefield
BY Schmidt, Johnson, Hovey, Williams & Bradley.
ATTORNEYS.

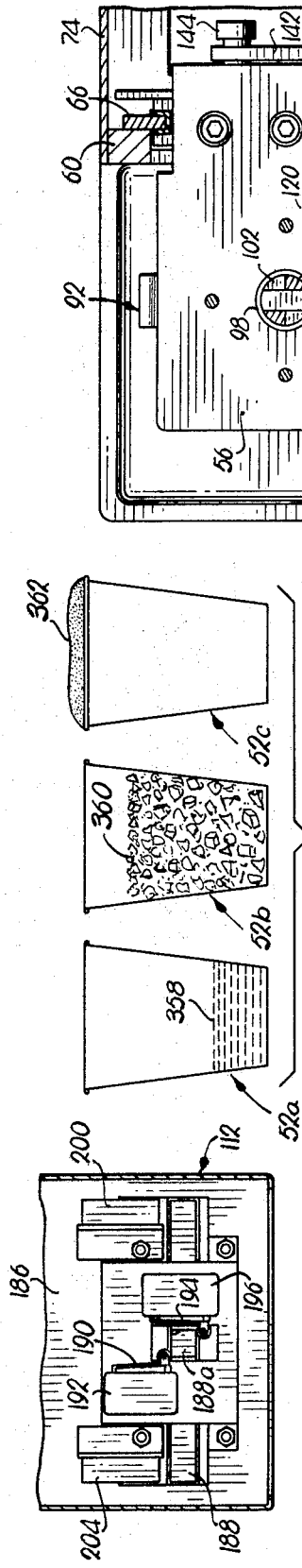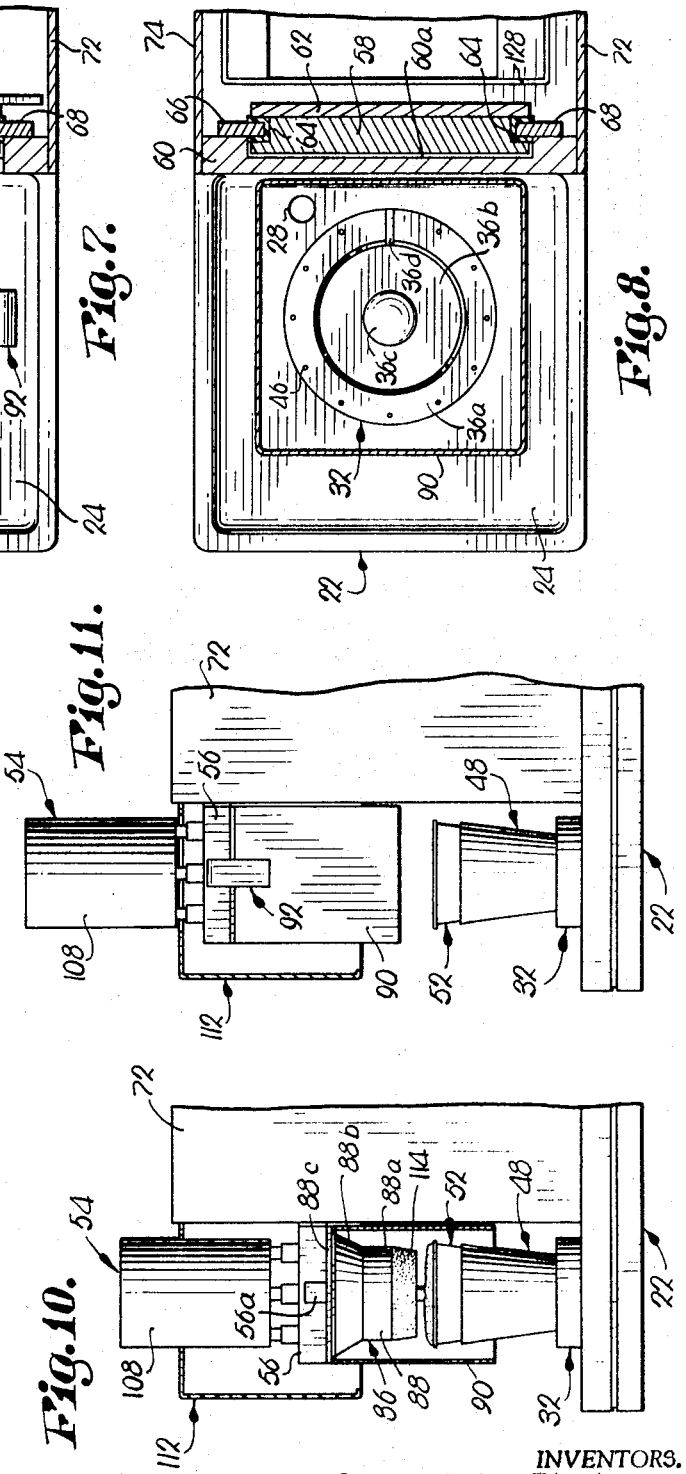

INVENTORS.
Stewart L. Black
John C. Littlefield

BY
ATTORNEYS.

METHOD AND APPARATUS FOR PREPARING CARBONATED BEVERAGES WITHIN A CUP

This invention relates to a novel method and apparatus for carbonating a beverage directly in a disposable cup therefor so that it is unnecessary for the product to be transferred to a separate container but may be consumed from the cup in which the beverage ingredients are mixed and carbonated. Beverages of any desired flavor may be prepared, either from water, ice or mixtures thereof so that a product in slush ice form or with larger amounts of liquid content may be made as selected by the operator of the novel apparatus.

BACKGROUND OF THE INVENTION

1. Field of the Invention

Application for Letters Patent Ser. No. 725,828, filed May 1, 1968 under the title "Method and Apparatus for Producing Frozen Carbonated Beverages," now U.S. Letters Pat. No. 3,505,075 and assigned to the same assignee as this application, discloses a novel process and equipment for preparing a frozen beverage in slush form and comprising finely divided ice combined with a flavoring agent and carbon dioxide absorbed by the liquid phase of the composition to enhance the taste of the product. The process and equipment of this preceding application represented an improvement over the art prior thereto in that slush ice beverage machines theretofore available which had been constructed along lines generally similar to commercial scale ice cream making machines were no longer required, thus eliminating many of the expenses of capital cost and maintenance inherent in these prior complicated, space wasting devices.

In most of the slush beverage machines of the basic ice cream freezing type attempts were made to use as many of the components of the original structure as possible with the addition of components for carbonating the liquid directed into the freezing chamber and to add a flavoring agent to the liquid either before or after its introduction into the area where the product was frozen. As a consequence, the horizontal freeze chamber which received the mix to be frozen and had a beater therein rotatable about a horizontal axis was retained so that the vanes of the beater could operate not only to remove a thin layer of frozen material from the interior wall of the chamber as the mix froze thereon, but also whip air into the composition to improve its consistency and flavor.

Efforts to improve the taste of the slush beverage produced in ice cream type equipment for the most part took the form of injection of carbon dioxide under pressure into the freezing chamber so that the liquid therein absorbed a part of the gas to produce a product having a limited degree of carbonation. However, in virtually all instances, the level of carbonation was so low as to not significantly enhance the taste of the beverage over a noncarbonated composition. The problem was not nearly so great with fruit flavors such as orange or cherry, as with cola and lemon or lime drinks where a high degree of carbonation of the material is required for the most pleasant taste.

Many of the problems associated with slush beverage machines based on the ice cream equipment concept were solved by the process and apparatus of application Ser. No. 725,828, particularly with respect to the initial cost of the units and the maintenance required in connection therewith. In addition, the apparatus of the preceding application permitted preparation of beverages of a wide variety of flavors, an attribute not present in the ice cream type machines since they were limited to one flavor in each freezing chamber available in a particular machine.

2. This Assignee's Prior Process and Apparatus

A required amount of chunk ice and a flavoring agent therefor were introduced into a rigid cylindrical receptacle in the apparatus of application Ser. No. 725,828 and the receptacle then placed on an elevatable platform which forced the receptacle upwardly through a displacement to cause a cylindrical plug to be forced downwardly into the open upper end of the receptacle to seal the interior of the container from the ambient atmosphere. Carbon dioxide under pressure was introduced into the receptacle in conjunction with rotation of cutter blades therein at high speed for a time to reduce the chunks of ice to fine particles in the form of slush. In view of the fact that a proportion of the ice melted during reduction thereof to a finely divided state, the liquid part of the mixture absorbed carbon dioxide from the atmosphere thereof maintained within the receptacle to produce a carbonated liquid. In addition, the liquid flavoring agent added to the container also absorbed a quantity of the carbon dioxide. As a result, upon return of the receptacle to its initial position below the plug closure, the composition in the container underwent considerable expansion providing a decided overrun. The beverage thus prepared was then necessarily poured into a separate disposable, single-service cup for customer consumption.

Although fully operable, the apparatus described briefly above had limitations from a commercial standpoint, primarily because of the necessity of mixing each beverage in a rigid container and then requiring transfer of the product to a cup for delivery to the customer. Not only was this procedure somewhat unsanitary, but more importantly, transfer of the slush beverage from the mixing receptacle to the dispensing cup agitated the beverage sufficiently to cause a considerable part of the carbon dioxide initially absorbed into the composition to be lost therefrom and decreasing the degree of carbonation of the product delivered to the customer.

In addition, facilities were required for cleansing the receptacle after each use, especially when beverages of different flavors were to be prepared in successive order. As a result, use of the equipment was somewhat difficult and did not fully lend itself to high-volume locations or those which of necessity very often operate with relatively inexperienced and unskilled personnel. Finally, the design of the prior unit was not as compact as desired nor constructed of essentially troublefree operating components having the necessary longevity for equipment used under the normal conditions encountered in dispensing of beverages to customers, either through a vending machine or soda fountain, drink bar or restaurant.

3. Description of the Prior Art

Although primarily intended for producing carbonated slush beverages of a large variety of flavors, the apparatus of the preceding application could also have utility in making cold carbonated products of different flavors wherein cold water alone or water in conjunction with particulate ice may be carbonated in single service quantities, thus avoiding the necessity of providing the usual bulk carbonating equipment required at fountains and other beverage preparing outlets.

U.S. Pat. No. 2,591,440 of Apr. 1, 1952, relating to "Carbonating Apparatus," illustrates and describes equipment said to be useful for carbonating water or a beverage in a rigid, generally cylindrical receptacle on a motor stand having a combination pump and impeller device disposed to be received within the liquid ingredients introduced into the mixing container. The structure is similar to a conventional malt mixer with the addition of mechanism for introducing carbon dioxide into the interior of the receptacle during operation of the apparatus. Kollsman had annular sealing structure on the lower floor part of his head unit for engaging the upper edge of the metal mixing receptacle to provide a gastight seal therearound, along with impeller and pump structure for pulling liquid from the container upwardly through a tube and then operable to eject such liquid in radial streams for mixing of the ingredients and to increase the area of the liquid components subjected to the carbon dioxide introduced into the interior of the mixing vessel.

SUMMARY OF THE INVENTION

It is a primary object of this invention to provide a process and apparatus for carbonating a beverage, either in liquid or slush ice form, directly in a cup of the normal, single-service, nestable type to eliminate the former necessity of transferring the beverage from a mixing receptacle into such a cup for serving the consumer.

An especially important object of the invention is to provide a method and apparatus of the characteristics described constructed in a commercially advantageous form and permitting preparation of carbonated liquid or slush ice products directly in a thin wall, tapered, disposable, single-service type cup readily used and widely available on the market for serving cold drinks notwithstanding the fact that the ingredients in the cup are agitated under an atmosphere of carbon dioxide maintained at a pressure which would deform the cup and render the process useless if it were not for the fact that novel techniques and components are provided for supporting the cup during preparation of the beverage therein without damage to the disposable container.

A further important object of the invention is to provide a method and apparatus having the advantages of the equipment shown and described in this assignee's preceding application but having the additional and superior characteristics of permitting preparation of the beverage directly in the cup in which the product is to be consumed thus significantly minimizing the procedural steps required by the operator to prepare each beverage product. Further improvements simplify cleansing of the equipment after each cyclic operation if desired, and provide for a safer operation of the mechanism notwithstanding the high pressures utilized in the cycle, even if the equipment is operated by relatively inexperienced or unskilled personnel.

A still further important object of the invention is to provide a method and apparatus for preparing a carbonated beverage wherein drive structure is provided for shifting a closure for the disposable cup into the open upper end thereof to provide a gastight barrier across the cup while the latter is supported complementally in a receptacle therefor, with unique, mutually operable components being provided for permitting the closure to freely move upwardly under the pressure of carbon dioxide maintained in the cup during agitation of the ingredients therein, so that the material in the disposable container may expand rapidly without interference from the closure and in a manner to preclude a tendency for the ingredients, during expansion thereof, to eject violently from the cup through a narrow annular passage presented between the interior wall surface of the cup and the closure during upward movement thereof that might otherwise be presented if the closure was not capable of completely free, unrestrained vertical travel after completion of the carbonating and mixing step.

BRIEF DESCRIPTION OF THE DRAWINGS

FIG. 1 is a front elevational view of apparatus embodying the preferred concepts of the present invention and especially suitable for carbonating a beverage directly in the dispensing cup therefor, certain parts of the apparatus as well as the cup being broken away for clarity and other parts being shown in dotted line presentation;

FIG. 2 is a vertical cross-sectional view taken substantially on the line 2—2 of FIG. 1 with certain of the parts which would otherwise be in section being shown in elevation for clarity and other components being broken away to better illustrate the members located therebehind;

Fig. 3 is a vertical sectional view taken substantially on the irregular line 3—3 of Fig. 2 and illustrating the operating components in the normal positions thereof when the apparatus is ready to commence stirring of ingredients within the dispensing cup located at the operating station of the apparatus;

FIG. 4 is a fragmentary, vertical cross-sectional view of the lower right-hand part of the components illustrated in FIG. 3, but in this instance showing the cam for displacing the latch which locks the cup closure in its cup sealing position thereof, just commencing to release the latch so that the closure may move freely upwardly under the pressure of gas maintained in the interior of the cup during preparation of a beverage product therein;

FIG. 5 is a fragmentary, vertical cross-sectional view similar to FIGS. 3 and 4 but illustrating the latch mechanism in another position of the same after the closure has moved upwardly under the pressure of gas released from the cup in the position thereof shown in FIG. 2;

FIG. 6 is a vertical cross-sectional view on the same line as FIG. 3 but showing the operating components in the positions of the same when the cup closure is at the uppermost location of the same above the cup station;

FIGS. 7 and 8 are horizontal cross-sectional views taken substantially on the line 7—7 and irregular line 8—8 of FIG. 2, while FIG. 9 is a fragmentary cross-sectional view taken essentially on the irregular line 9—9 of FIG. 2;

FIG. 10 is an essentially schematic showing of the components of the apparatus in the positions thereof after the closure has been ejected from the cup by expansion of the carbon dioxide therein and immediately prior to further upward movement of the closure by operating mechanism forming a part of the apparatus;

FIG. 11 is a schematic representation similar to FIG. 10 but showing the closure in the normal standby position of the same above the cup station;

FIG. 12 is a schematic representation of the normal level of ingredients in the disposable cup during various stages of the preparation of a carbonated beverage of the slush ice type, with the left cup showing the level of flavoring agent normally added, the center cup representing the level of ingredients after addition of the preferred amount of chuck ice to the cup, and the right-hand cup illustrating the level of the product after completion of the carbonating and stirring steps and removal of the closure from the cup to permit the material in the cup to undergo expansion therein;

DESCRIPTION OF PREFERRED EMBODIMENT

Figure 13:
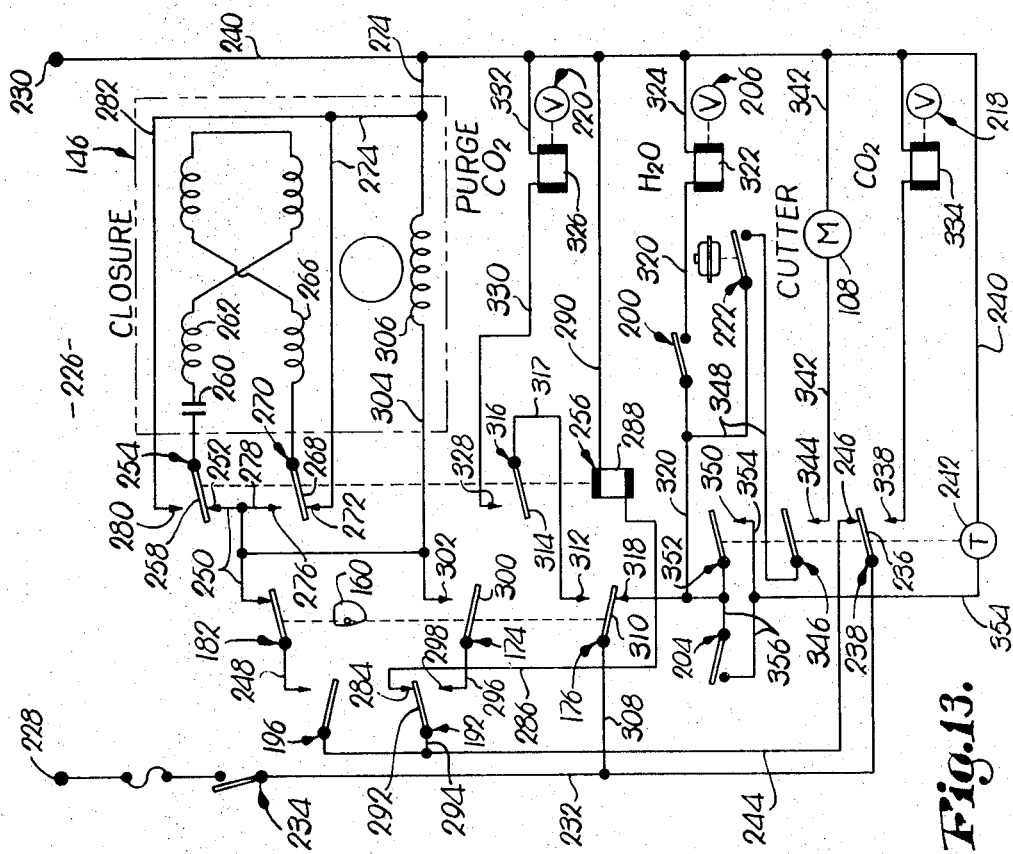
FIG. 13 is a schematic showing of a suitable electrical control circuit for the processing apparatus.
Figure 14:
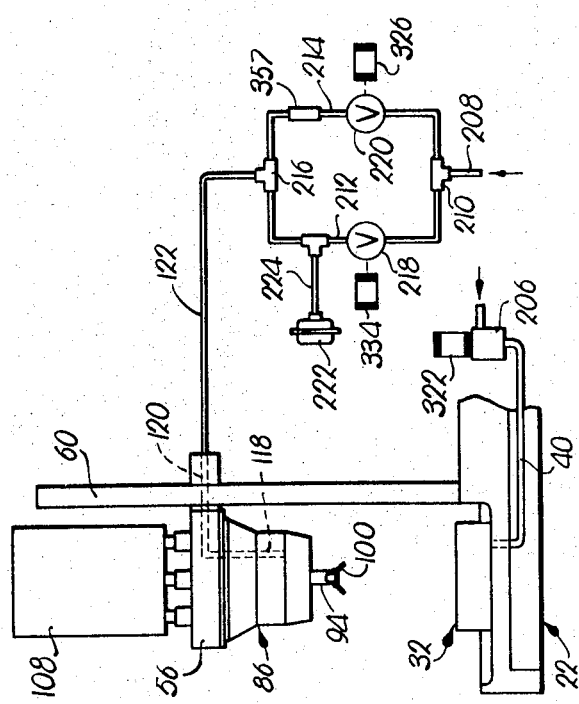
FIG. 14 is a generally schematic showing of the pneumatic and hydraulic system of the apparatus.

Preferred apparatus for carrying out the novel process of this invention is broadly designated by the numeral 20 in the drawings and includes a rectangular base unit 22 having an upwardly facing, generally square depression 24 in the forwardmost part of the base unit along with a relatively large aperture 26 in the central part of the depression. A vertical passage 28 (FIGS. 2 and 8) through unit 22 adjacent the rear portion of depression 24 is joined to a drain line 30 leading to a sewer drain or liquid collection receptacle. A support station broadly designated 32 on base unit 22 within the depression 24 has a lower plate 34 overlying and covering aperture 26, as well as a circular, downwardly opening cup member 36 surrounding plate 34 and cooperating with the upper surface thereof to present a chamber 38 which communicates with water supply line 40 joined to the fitting 42 through plate 34 and communicating with the chamber 38.

The upper face 36a of member 36 has a central annular groove 36b therein defined in part by a central, generally circular, dome-shaped segment 36c. The peripheral part of member 36 has a series of upwardly extending, relatively narrow passages 44 therein extending from the chamber 38 and terminating in upwardly opening orifices 46 surrounding groove 36b as shown in FIG. 2.

The member 36 serves as a support for a metallic receptacle 48 in the nature of a tapered cup which decreases in diameter as the dome-shaped bottom 48a thereof is approached. The lower diameter of receptacle 48 defined by the zone of merger of the side wall 48b with bottom 48a is essentially the same as the outer diameter of groove 36b so that the receptacle is restrained against lateral movement when positioned on support station 32. Bottom 48a is also provided with a circular opening 50 which complementally fits over segment 36c for reasons hereinafter explained.

As is evident from FIG. 2, receptacle 48 is designed to complementally receive a conventional thin wall, disposable, single-service, tapered up 52 in which the product is prepared and then consumed, and preferably of the seamless type fabricated from a synthetic resin for high strength to weight characteristics. It will now be understood that the opening 50 permits insertion of a finger to dislodge the single-service cup 52 from the receptacle 48 and raise the cup sufficiently that it need not be unsatisfactorily handled by its rim.

The mixing and carbonating assembly 54 of apparatus 20 directly overlying support station 32 has a main horizontal plate 56 which is affixed to and supported by an upright plate 58 (FIGS. 2 and 8) mounted for reciprocation on upright support structure 60 immediately behind depression 24 in base unit 22. As is apparent from FIG. 8, the rearwardly facing, upright surface of structure 60 is cut away to present a channel 60a which receives and guides plate 58. An outer plate 62 joined to the rear face of plate 58 cooperates with the opposed, upright notches 64 in the rear upright margins of plate 58, to define vertical channels that in turn receive the vertical guide members 66 and 68 on opposed rear, upright faces of support structure 60. Antifriction devices within the notches 64 minimize resistance to vertical reciprocation of plate 58 relative to support structure 60. The upper part of support structure 60 is provided with a rectangular opening 70 therein for clearing components operable to shift plate 56 vertically as will be explained.

The opposed sidewalls 72 and 74 of apparatus 20 joined to base unit 22 as well as the support structure 60, and to rear wall 76 and top wall 78, serve to support a pair of opposed rollers 80 and 82 having coil leaf springs 84 therearound joined at the free ends thereof to plate 62 (FIGS. 2 and 3) for biasing assembly 54 toward the upper position of the same as illustrated in FIG. 11.

A cup closure broadly designated 86 (FIGS. 1, 2, 10 and 14) has a body 88 of synthetic resin material defined by a lower cylindrical section 88a which merges at its upper margin with a generally conical section 88b of increasingly greater diameter as the upper end thereof is approached. A square upper section 88c integral with the top of section 88b normally lies in flat engagement with the underface of plate 56 and is held thereagainst by a tubular shield 90 which is square in horizontal section and releasably mounted on plate 56 in depending relationship therefrom by releasable fasteners 92 on opposite sides of the shield as best shown in FIG. 1. As is apparent from this Figure, fasteners 92 carried by the upper end of shield 90 on opposite sidewalls thereof have upper hook portions 92a which are adapted to be received over the upper edge of projections 56a on plate 56.

Body 88 has an upright, elongated, longitudinally irregular bore 88d therethrough which receives an elongated cutter shaft 94 rotatably held in bore 88d by combination bearing and sealing structure 96 of conventional design permitting high-speed rotation of shaft 94 while at the same time precluding passage of gas under pressure through the bore 88d to the aperture 98 in plate 56 axially aligned with bore 88d and receiving the circular extension 88e on the top face of square section 88c. Four radially extending cutter blades 100 secured to the lower end of shaft 94 and having sharpened longitudinal leading edges are configured so that two opposed blades are bent slightly downwardly while the other two opposed blades are bent upwardly to a certain extent as illustrated in FIG. 2.

A segmental coupling 102 on the upper end of shaft 94 is adapted to complementally engage a similar segmental coupling 104 on the lower end of motor shaft 106 depending from motor 108 carried above plate 56 in axial alignment with aperture 98 by combination fastening and spacing devices 110. A square housing 112 carried by structure 60 in surrounding relationship to motor 108 and open at the bottom thereof envelops the upper end of assembly 54 but does not interfere with vertical reciprocation thereof.

A flexible annular sleeve 114 of synthetic rubber or equivalent material and having an inwardly directed, downturned lip 114a on the upper end thereof, is secured to the lower part of section 88a of closure 86 by a plate 116. It is important to note that the sleeve 114 complementally fits within the upper open end of cup 52 and engages the interior wall thereof in direct opposition to the uppermost end of receptacle 48 as shown in FIG. 2.

Body 88 of cup closure 86 has a generally L-shaped carbon dioxide passage 118 therein which communicates with the interior of cup 52 through aperture 116a in plate 116, as well as with L-shaped passage 120 in plate 56 and extending toward the rear thereof as illustrated in FIG. 7. Carbon dioxide supply line 122 is coupled to the inlet of passage 120.

Mechanism broadly designated 124 is provided in the rear portion of apparatus 20 defined by walls 72, 74 and 76, for reciprocating mixing and carbonating assembly 54 upon command. Upright support plate 126 and channel members 128 and 130 form structural support for mechanism 124.

A horizontal, rearwardly extending shaft 132 carried by suitable bearings therefor in the transversely extending main wall of channel member 128 as well as plate 126 and extending rearwardly of the latter, has a cross pin 134 on the rear end thereof in radially extending relationship thereto. Sleeve 136 secured to shaft 132 within channel member 128 adjacent plate 126 has a crank arm 138 thereon which is connected by a pivot 140 to a dogleg arm 142 swingably secured to the rear face of plate 56 by pivot 144.

Reversible gear motor 146 secured to the rear main plate portion of channel member 130 has a forwardly extending output shaft 148 which extends through aperture 150 in member 130 and has a sleeve coupling 152 thereon in axial alignment with shaft 132. Opposed segments 154 and 156 integral with sleeve coupling 152 extend forwardly therefrom to an extent to engage cross pin 134 during rotation of output shaft 148 as is apparent from FIGS. 2–6.

Latch means broadly designated 158 for holding assembly 54 in the lowermost position of the same as illustrated in FIG. 2 comprises a combination cam and latch plate 160 secured to shaft 132 for rotation therewith and having a notch 162 in the outer peripheral cam edge 160a as best seen in FIGS. 3–5. The latch 164 pivotal on pin 166 extending between plate 126 and the main planar section of channel member 130 has a tab 168 thereon disposed to be received within notch 162 when assembly 54 is in its lower position as indicated in FIGS. 2 and 3.

A release cam for latch 164 comprises an arm 172 extending out from coupling 152 in a radial direction to engage latch 164 and cam the tab element 168 thereof out of notch 162 during initial reverse rotation of shaft 148 as will be explained in detail hereinafter. Spring 169 on pin 166 engaging the latch 164 and base unit 22 respectively serves to bias the outer end of the latch into normal contact with the cam periphery 160a of latch plate 160.

The two switches 174 and 176 mounted on the rear face of plate 126 above cam plate 160 have actuator arms 178 and 180 respectively, with actuator 178 being of T-shaped configuration to also effect operation of arm 180 upon engagement of the peripheral edge of the cam with the inner actuator arm 178.

A single switch 182 mounted on the rear face of plate 126 above shaft 132 and to the left of switches 174 and 176 viewing FIGS. 3, 5 and 6, has an actuator arm 184 located to be engaged by the peripheral margin of cam 160 when the latter is in another disposition of the same as for example, shown in FIG. 6.

Mounted on the front wall 186 of housing 112 is a closure actuator bar 188 shown in its normal position but which may be shifted upwardly for operating motor 146 in one direction to move closure assembly 54 upwardly, or shifted downwardly to cause motor 146 to be actuated in the opposite direction and thereby effect lowering of assembly 54 into the position of the same shown in FIG. 2. The switch actuator 188a of bar 188 projecting rearwardly of wall 186 operates the actuator arm 190 of switch 192 when bar 188 is depressed, and actuates the arm 194 of switch 196 when the bar 188 is shifted upwardly.

Structure for controlling the wash cycle of apparatus 20 comprises a pushbutton 198 on the front wall 186 of housing 112 above the left-hand end of bar 188 and operable to actuate a switch 200 adjacent switch 192, while the mix control button 202 above the opposite end of bar 188 is operable to actuate the switch 204.

The pneumatic and hydraulic system of apparatus 20 includes a solenoid actuated valve 206 in water line 40 for controlling delivery of water to the orifices 46. Carbon dioxide supply line 208 is joined to the inlet of a tee 210, while the outlets of the latter are joined to branch lines 212 and 214 respectively. Another tee 216 serves to couple the outlets of lines 212 and 214 to the carbon dioxide supply line 122 leading to plate 56. Solenoid controlled valves 218 and 220 in lines 212 and 214 respectively control flow of carbon dioxide therethrough while a diaphragm actuated pressure switch 222 communicates with line 212 through conduit 224 teed into line 212.

The control circuit 226 illustrated schematically in FIG. 13 of the drawings is intended to be representative only of components operably interrelated to effect actuation of the elements of apparatus 20 in proper sequence, but it is to be understood that the circuit shown and described herein is a representative diagram only and that other equivalent arrangements may be used in lieu of the system specifically disclosed. The terminals 228 and 230 are adapted to be connected to a suitable source of alternating current with line 232 having a single pole, single throw main control switch 234 therein and connected to the arm 236 of timer switch 238. Line 240 couples terminal 230 to the windings of timer motor 242. Line 244 extends from the normally closed contact 246 of timer switch 238 to the switch 196 which is normally open. Line 248 couples the normally open contact of switch 196 to the switch arm of normally closed switch 182, while line 250 connects the normally closed contact of switch 182 to the contact 252 of relay switch 254 forming a part of relay 256. The switch arm 258 of relay switch 254 is connected through capacitor 260 to one set of field windings 262 of a reversible motor 146. The opposite windings 266 of motor 146 also joined to windings 262 are connected to the switch arm 268 of relay switch 270. The normally closed contact 272 of relay switch 270 when relay 256 is energized, is connected to line 240 by line 274 while the opposed, normally open contact 276 is connected to line 250 by a line 278. Contact 280 of relay switch 254 is coupled to line 274 by a line 282.

Contact 284 of single pole, double throw switch 192 is connected by line 286 to the coil 288 of relay 256 and to line 240 by line 290. The arm 292 of switch 192 is connected by line 294 to line 244, and line 296 connects contact 298 of switch 192 to the switch arm 300 of switch 174. Arm 300 is normally maintained out of engagement with contact 302 of switch 174 by combination cam and latch plate 160 when the closure assembly 54 is in the lower position of the same as shown in FIGS. 1 and 2. Line 304 extending between contact 302 of switch 174 and line 274 has the armature windings 306 of motor 146 therein.

Line 308 joins the switch arm 310 of switch 176 to line 232 and the contact 312 of said switch 176 is connected to the switch arm 314 of relay switch 316 by line 317. Again as indicated schematically in FIG. 13, the cam and latch plate 160 normally maintains the switch arm 310 out of engagement with contact 312 and in engagement with the contact 318 that is in turn connected to the single pole, single throw wash water control switch 200 in line 320 leading from contact 318 to the coil 322 of water control valve 206. Line 324 connects coil 322 to line 240.

The coil 326 of carbon dioxide purge valve 220 is connected to the contact 328 of relay switch 316 by line 330 and to line 240 by line 332. Coil 334 of carbon dioxide inlet valve 218 is joined by line 336 to the contact 338 of timer switch 238 and to to line 240 by line 340. Line 342 joining the contact 344 of timer switch 346 with line 240 has the windings of cutter motor 108 therein so that the latter is operated upon closing of switch 346 through pressure switch 222 in line 348 leading to line 320.

The contact 350 of timer switch 352 is connected to timer motor 242 by line 354 while the normally open, single pole, single throw mix control switch 204 is interposed in line 356 extending between line 354 and line 320.

Although not detailed in the drawings it is to be understood that branch carbon dioxide line 214 has a restriction therein in the nature of a capillary passage, as for example within the member 357 downstream of valve 220 to restrict delivery of carbon dioxide to passages 120 and 118 upon actuation of the coil 326 of valve 220.

OPERATION OF THE PREFERRED EMBODIMENT

The normal standby position of apparatus 20 is shown in FIG. 11 of the drawings although in this instance normally the receptacle 48 and cup 52 will be removed from the support station 32. Assuming initially that the operator desires to prepare a flavored slush beverage from chunk ice, a quantity of liquid flavoring agent is placed in cup 52 substantially to a level 358 as indicated schematically on the cup 52a of FIG. 12. The preferred single-service cups for preparation of the beverage are those made of a synthetic resin such as polyethylene so that the cup is of somewhat translucent characteristics. As a consequence, if the lower part of receptacle 48 is suitably colored with a dark paint, such paint can readily be seen through the sidewall of the cup and the liquid flavoring agent poured into cup 52 until the level 358 is reached as indicated by the top of the dark area provided in the interior of receptacle 48.

Next, ice in chunk form is introduced into the cup 52 to a preferred level indicated by the numeral 360 in cup 52b of FIg. 12. Again, another line or different colored area may be provided on the interior surface of sidewall 48b of receptacle 48 to guide the operator in filling the cup with ice. Apparatus 20 is especially useful at dispensing outlets which normally include an ice maker as a standard part of their equipment and for best results, such ice maker should be of the type capable of producing chunk ice having a generally rectangular shape and of the order of one-quarter inch to one-half inch in size. Generally, the particulate ice after formation thereof into chunks of desired size is stored in a hopper and dispensed through a control gate that may be selectively actuated. Relatively hard ice is preferred for this application since only a small fraction thereof will melt during reduction of the same to a finely divided state, notwithstanding the fact that apparatus 20 is used under ambient temperature conditions, and therefore a more desirable slush beverage product is produced during use of the processing apparatus.

After placement of cup 52 and receptacle 48 in a position as illustrated in FIG. 11, the bar 188 is depressed to cause the extension 188a thereof to operate the switch actuator 190 of switch 192 to thereby shift arm 292 into engagement with contact 298 and provide a circuit to the field windings 266 of motor 146 through relay switch 270 since the arm 268 thereof has moved into engagement with contact 276 upon deenergization of coil 288 of relay 256 by interruption of its energization path through the contact 284 of switch 192. In both instances of operation of reversible motor 146 it can be seen that the armature windings 306 thereof are furnished power from either line 250 or closed switch 174 connected to contact 298 of switch 192.

The coil 326 of purge valve 220 is momentarily energized during downward movement of the closure 86 by virtue of the closing of switch 316 of relay 256 upon deenergization thereof, thereby causing carbon dioxide under pressure to be forced through passages 120 and 118 but at a relatively small rate of flow because of the restriction afforded by capillary member 357. The carbon dioxide forced through the orifice 116a tends to move beneath the air therein and displace such air upwardly because of the greater density of the carbon dioxide. As a consequence, the air is effectively ejected from the cup 52 above the level of ice and syrup therein and a blanket of carbon dioxide is substituted for the air prior to engagement of sleeve 114 with the inner surface of the cup 52.

Motor 146 ceases to operate upon return of the cam plate 160 to the initial disposition of the same as shown in FIG. 3 with the cam surface 160a in engagement with actuator 178 to return switches 174 and 176 to the initial condition of the same. The conductive path to coil 326 of purge valve 220 is also broken.

As closure 86 moves downwardly the sleeve 114 is brought into progressive engagement with the inner surface of the cup and the skirt portion of the sleeve is deformed inwardly to provide a pressure-tight seal against the inner wall surface of the cup 52 as the adjacent portion thereof is forced into tight contact with the upper edge of receptacle 48 to thereby clamp the cup between the wall 48b and the depending skirt portion of sleeve 114. Injection of carbon dioxide into the interior of cup 52 as will be explained, causes the sleeve 114 to be forced outwardly into tighter engagement with the cup 52 and thereby providing a tight seal which increases in its resistance to leakage of gas therepast as the pressure of carbon dioxide in the interior of the cup is increased.

When the operator pushes the mix button 202 to close the switch 204, timer motor 242 is energized through the closed switch 176 to thereby close switch 352 and provide its own holding circuit through switch 176 and at the same time energize coil 334 of carbon dioxide control valve 218 through the now closed switch 238. Carbon dioxide under pressure is forced into the interior of cup 52 via line 208, branch line 212, line 122 and passages 120 and 118. The preferred pressure of the carbon dioxide is within the range of 20–25 p.s.i.g. although the operable range is within the limits of slightly above 0 p.s.i.g. to about 50 p.s.i.g. However, at pressures above 30 p.s.i.g. excessive foaming of the product may occur upon release of the pressure in cup 52.

Either simultaneously with energization of coil 334 of valve 218 or shortly thereafter, the switch 346 of the timer is closed to provide a path for energizing the windings of motor 108. As soon as switch 222 closes because of buildup of pressure in cup 52 to a required preset level as sensed by diaphragm switch unit 222, motor 108 is operated to rotate the shaft 94 and thereby cutter blades 100 thereon at a high rate of speed. Using a 20,000 r.p.m. (no load) universal type motor, the shaft 94 should normally be rotated for a period within the range of 5–30 seconds, with 7 seconds being satisfactory for a 9 oz. drink and 12 seconds being preferred for an 18 oz. drink.

As will be explained, the time of rotation of cutter 94 when correlated with the pressure of carbon dioxide in cup 52 should be such that upon removal of closure 86 from the cup and expansion of the product therein, it will rise to substantially the level 362 as indicated schematically on the cup 52c of FIG. 12 and present a substantially dome-shaped overrun above the upper edge of the cup 52 but not sufficient to cause the product to run down the sides of the cup. The interval of rotation of the blades 100 is under the control of timer 242 while the pressure of the carbon dioxide within cup 52 may be adjusted by a suitable control valve at the outlet of the carbon dioxide source.

Upon completion of the agitation and stirring of the ice within cup 52, the remaining particles of ice are in finely divided form and the liquid part of the ingredients including melted ice and the flavoring agent have absorbed carbon dioxide to produce a highly carbonated beverage.

Actuation of the bar 188 by raising the same to close switch 196 effects energization of windings 262 of reversible motor 146 through contact 246 of timer switch 238, the switch 182 held in a closed position by cam and latch plate 160, and the contact 252 of relay 256 which is maintained in an energized condition through the contact 284 of down switch 192. Energization of the windings 262 of motor 146 causes the shaft 148 to be rotated in a direction to cause arm 172 to cam latch 164 out of its disposition with tab 168 in latching relationship to plate 160. As indicated in FIG. 4, the segments 154 and 156 are in spaced relationship from the cross pin 134 during the initial movement of output shaft 148 of motor 146 and as a consequence, the shaft 132 is free to rotate through an arcuate path before pin 134 contacts the segments 154 and 156. Freeing of the plate 160 from latch 164 permits shaft 132 to rotate freely under the influence of the upward pressure of the gas on closure 86 and thus the assembly 54 is rapidly forced upwardly at a rate faster than that of expansion of the product in cup 52 so that the beverage is free to expand upwardly to the level illustrated in cup 52c of FIG. 12, without interference by cup closure 86. Viewing FIGS. 3 and 4, it can be seen that upon release of the latch 164, the pivot point 140 of the linkage joining shaft 132 to plate 56, is to the left of a line through the axis of shaft 132 so that the forces on cup closure 86 may force plate 56 upwardly without interference from the connecting parts for raising and lowering assembly 54. The position of closure 86 at the time reversible motor 146 picks up cross pin 134 to continue the upward movement of plate 56, is illustrated in FIG. 10 of the drawings. Rotation of the cam plate 160 causes the switch 174 to close and the switch arm 310 of switch 176 to move out of engagement with contact 318 and into engagement with contact 312 as soon as the cam edge 160a of plate 160 clears the actuator arm 178. When arm 142 reaches the upper end of its path of travel the circuit to windings 262 is broken by engagement of cam plate 160 with the actuator 184 of switch 182 to open the latter.

When assembly 54 ceases upward movement, the receptacle 48 and cup 52 therein may be removed from cup station 32 for delivery of the product to the customer. Hole 50 in the bottom of receptacle 48 permits the operator of apparatus 20 to insert his finger through the bottom of the receptacle and force cup 52 upwardly for easy removal thereof and also negate the necessity of his unsanitarily grasping cup 52a by the upper edge portion thereof which might ultimately be contacted by the lips of the consumer.

If a beverage of different flavor is to be prepared in the next operation of apparatus 20, the operator lowers the assembly 54 to the disposition shown in FIGS. 1 and 2 but without the receptacle 48 and cup 52 therein so that the shield 90 is in proximal relationship to support 32. Depression of button 198 causes the wash switch 200 to be closed thereby energizing coil 322 of water control valve 206 through the closed contact 318 of switch 176. Opening of valve 206 permits water under pressure to be delivered to the chamber 38 via line 40 so that the water is forced upwardly into the interior of the shield 90 through the orifices 46. The streams of water thoroughly cleanse all of the exposed surfaces of assembly 54 and the water collecting in the depression 24 of base assembly 22 drains therefrom through line 30. Notch 36d in face 36a of cup member 36 prevents liquid from accumulating in groove 36b.

It should also be noted at this juncture that the shield 90 serves to prevent spraying of product onto an operator of apparatus 20 during preparation of a beverage, if for any reason the sleeve 114 fails to effectively seal the interior of cup 52 from the ambient atmosphere. However, the pressure switch 222 normally prevents operation of motor 108 unless the pressure within the interior of the cup builds up to a requisite level. For example, a particle of ice could adhere to the sidewall of cup 52 and prevent proper sealing engagement of sleeve 114 with the cup so that the interior of the cup remains in communication with the atmosphere after cup closure 86 has been shifted downwardly to the lower end of its path of travel.

Although the description thus far has dealt exclusively with preparation of a slush beverage, it is to be understood that other types of drinks may also be prepared in apparatus 20 with equal facility. If cold water is used, it is not necessary to introduce ice into the liquid to prepare a carbonated beverage, particularly where a relatively low carbonated product is desired.

On the other hand, if a colder drink is desired, a proportion of ice may be added to the cup along with water and a flavoring agent prior to agitation of the liquid under an atmosphere of carbon dioxide within cup 52 during cyclic operation of apparatus 20. In certain instances the flavoring agent may be eliminated entirely if only carbonated water is desired, or a dry flavoring ingredient may be added to the mixture of water and ice or ice alone in place of a liquid flavoring composition.

In summary, important features of the apparatus include the fact that any number of flavors may be processed limited only by the available supply thereof, the fact that the entire unit is of relatively simple design permitting rapid and efficient cleaning thereof, it is less costly to manufacture than prior art devices for carbonating beverages, and the same unit may be used without modification for making carbonated slush ice drinks as well as the more liquid type beverages. The overall assembly occupies very little space and may be used at counter height without special mounts being required therefor.

Having thus described the invention, what is claimed as new and desired to be secured by Letters Patent is:

1. A method of preparing a carbonated product comprising the steps of:

introducing a quantity of a material to be carbonated into a disposable, single-service, tapered cup, at least a part of the material being in liquid form capable of absorbing carbon dioxide;

inserting a gastight barrier into the open top of the cup in engagement with the interior surface of the wall structure thereof and thereby sealing the interior of the cup from the atmosphere;

directing carbon dioxide under pressure through the barrier into the interior of the cup, the wall structure of the cup being of a type inherently unable to withstand the pressure of said carbon dioxide thereon without deformation;

holding the barrier in the cup during delivery of carbon dioxide to the cup against the pressure of the carbon dioxide;

positioning a rigid support for the wall structure of the cup around the exterior thereof and in opposition to expansion thereof by the barrier to preclude expansion and deformation of the cup by the pressurized carbon dioxide and leakage of the latter from the cup around the barrier;

imparting cutting forces to the material in the cup at a rate to violently agitate said material and thus increase the surface area of the liquid portion thereof to an extent to promote absorption of carbon dioxide by the liquid; and releasing the barrier for free movement out of the cup under the influence of the pressurized carbon dioxide after discontinuance of agitation of the material.

2. A method as set forth in claim 1 wherein is included the step of directing carbon dioxide into the cup prior to insertion of the barrier therein to replace air in the cup with carbon dioxide.

3. Apparatus for preparing a carbonated product comprising:

an open-top, rigid, tapered receptacle adapted to complementally hold a disposable, single-service, tapered, deformable wall cup whereby the wall structure of the cup is supported by the receptacle, said cup being adapted to receive a quantity of material to be carbonated at least a part of which is in liquid form capable of absorbing carbon dioxide;

a closure for the open top of the cup;

means for moving the receptacle and said closure relatively to bring the closure into a position engaging the cup and sealing the interior thereof from the ambient atmosphere;

means for introducing carbon dioxide into the interior of the cup while the closure is in the cup closing disposition thereof and for maintaining an atmosphere of carbon dioxide therein at a pressure level which would deform the cup if not supported by the receptacle; and means for agitating the material in the cup while under the pressure of said carbon dioxide and at a rate to increase the surface area of the liquid portion thereof to an extent to promote absorption of carbon dioxide by the liquid, said means for moving the closure and receptacle relatively including mechanism connected to the closure for shifting the latter from a location above the top of a cup held by the receptacle, downwardly into the sealing position thereof engaging said cup, and operable after completion of agitation of the material to return the closure to said upper location of the same.

4. Apparatus as set forth in claim 3 wherein said closure is provided with sealing means located to engage the inner surface of the wall structure of a cup held by the receptacle, along an area in direct opposition to a part of the receptacle when the closure is in the sealing position thereof so that a gastight seal is provided by clamping of the wall structure of the cup between the closure and the receptacle.

5. Apparatus as set forth in claim 3 wherein said means for agitating the material comprises a cutter extending through the closure and provided with cutter blades disposed to be received within a cup held by the receptacle when the closure is in the sealing position thereof, and power means coupled to the cutter for rotating the blades thereof at high speed.

6. Apparatus as set forth in claim 3 wherein said mechanism includes power means for shifting the closure downwardly into the sealing position thereof and to hold the closure in said sealing position against the pressure of said atmosphere of carbon dioxide maintained in the cup during agitation of the material therein, said power means including components operable upon completion of agitation of the material to permit the closure to freely move upwardly out of the cup under the force of the pressurized carbon dioxide trapped in the cup so that the closure is ejected from the cup at a faster rate than the expansion of said material in the cup upon release of the carbon dioxide pressure thereon.

7. Apparatus as set forth in claim 6 wherein said power means includes an electric motor having an output shaft, a vertically movable support carrying the closure thereon, linkage joined to said support, coupling means for connecting the output shaft to said linkage for driving the support and thereby the closure downwardly into the sealing position of the latter during one cycle of operation of the motor, and means for discontinuing operation of the motor when the closure has been moved into said sealing position of the same.

8. Apparatus as set forth in claim 7 wherein is provided latch means engageable with said coupling means for releasably holding the closure in said sealing position thereof, said coupling means including structure for releasing the latch means upon completion of the agitation of said materials.

9. Apparatus as set forth in claim 8 wherein said motor is reversible and the coupling means comprises a driven shaft secured to the linkage and axially aligned with the output shaft of the motor, a cross pin on the driven shaft, and a segmental member secured to the output shaft of the motor and having spaced segments in positions to engage the cross pin and thereby provide a lost motion connection between the output shaft and said driven shaft.

10. Apparatus as set forth in claim 9 wherein said coupling means includes a plate secured to the driven shaft for rotation therewith and provided with a notch in the outer periphery thereof, said latch means including a swingable latch element located to be received within the notch in said plate when the linkage is in the location thereof with said closure in the sealing position of the same, and a cam extending outwardly from the segmental member at an angle to engage the latch element and swing the latter out of said notch during reverse operation of the motor and prior to engagement of said segments with the cross pin to return said linkage and thereby the closure to the upper locations of the same.

11. Apparatus as set forth in claim 3 wherein is provided a shield in circumscribing, spaced relationship to the closure and movable therewith.

12. Apparatus as set forth in claim 11 wherein is provided a platform for supporting said receptacle and having a series of water passages therethrough which terminate in upwardly opening orifices within the confines of an area directly beneath the shield, and water supply means connected to said passages for directing water thereto upon command under sufficient pressure to force cleansing streams of water upwardly from respective orifices into the interior of the shield and against the closure and said means for agitating the material.

13. Apparatus as set forth in claim 3 wherein said closure comprises a plug configured to be received within the open upper end of a cup held by the receptacle, and an annular resilient band secured to the periphery of the plug and depending therefrom in disposition to engage the inner tapered surface of the cup wall structure, said pressurized carbon dioxide introduced into the cup serving to force the band outwardly against the cup wall structure to provide a gastight seal therebetween.

14. Apparatus as set forth in claim 13 wherein said means for introducing carbon dioxide into the cup includes a source of the carbon dioxide under pressure, a line leading from said source, and valve means in said line for controlling flow of carbon dioxide from the source thereof through the line, said closure being provided with a passage connected to the outlet of said line and terminating in a downwardly opening orifice located to communicate with the interior of the cup when said closure is in the sealing position of the same.

15. Apparatus as set forth in claim 3 wherein said receptacle is provided with a hole at the bottom thereof of sufficient diameter to permit insertion of a finger to facilitate ejection of a cup held by the receptacle.

16. Apparatus as set forth in claim 3 wherein is provided means mounting the closure for movement relative to the receptacle, said means for agitating the material in the cup comprising an electric motor mounted on the closure for movement therewith and having a downwardly directed output shaft, a cutter shaft joined to the motor shaft and extending through the closure, a series of cutter blades on the cutter shaft below the closure, and packing means on the closure engaging the cutter shaft for providing a gastight seal therebetween.

* * * * *